US 10,983,936 B2

(12) United States Patent
    Curtis

(10) Patent No.: US 10,983,936 B2
(45) Date of Patent: Apr. 20, 2021

(54) PROGRAMMABLE ARBITRARY SEQUENCE DIRECT MEMORY ACCESS CONTROLLER FOR CONFIGURING MULTIPLE CORE INDEPENDENT PERIPHERALS

(71) Applicant: Microchip Technology Incorporated, Chandler, AZ (US)

(72) Inventor: Keith Edwin Curtis, Queen Creek, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/377,439

(22) Filed: Apr. 23, 2019

(65) Prior Publication Data

US 2020/0272588 A1    Aug. 27, 2020

Related U.S. Application Data

(60) Provisional application No. 62/811,400, filed on Feb. 27, 2019.

(51) Int. Cl.
    *G06F 13/28*    (2006.01)
    *G06F 12/02*    (2006.01)
    *G06F 12/1081*  (2016.01)

(52) U.S. Cl.
    CPC ........ *G06F 13/287* (2013.01); *G06F 12/0246* (2013.01); *G06F 12/1081* (2013.01)

(58) Field of Classification Search
    CPC . G06F 13/287; G06F 12/0246; G06F 12/1081
    See application file for complete search history.

(56) References Cited

U.S. PATENT DOCUMENTS

| 5,151,983 | A  | * | 9/1992  | Nishiguchi ............. G11C 8/04 365/189.05 |
| 5,513,374 | A  | * | 4/1996  | Baji .................. G06F 13/32 710/26 |
| 5,678,063 | A  |   | 10/1997 | Odom et al. ................ 710/22 |
| 6,189,082 | B1 | * | 2/2001  | Ramamurthy ......... G06F 13/28 711/170 |
| 6,202,106 | B1 | * | 3/2001  | Baxter .................. G06F 3/14 710/22 |
| 10,360,164 | B1 | * | 7/2019 | Julicher ............... G06F 13/102 |

(Continued)

FOREIGN PATENT DOCUMENTS

| EP | 2089804 B1 | 11/2011 | ............. G06F 13/28 |
| GB | 2186719 A  | 8/1987  | ............. G06F 13/28 |

OTHER PUBLICATIONS

International Search Report and Written Opinion, Application No. PCT/US2019/038390, 23 pages, dated Jan. 13, 2020.

(Continued)

*Primary Examiner* — Henry Tsai
*Assistant Examiner* — Aurangzeb Hassan
(74) *Attorney, Agent, or Firm* — Slayden Grubert Beard PLLC

(57) ABSTRACT

A programmable arbitrary sequence direct memory access (DMA) controller accesses sequentially addressed memory locations (source or destination) using address pointer registers. Each sequentially addressed memory location containing an indirect memory address is stored in an address latch and used to access the actual non-sequential memory location to be accessed by the DMA transfer.

25 Claims, 5 Drawing Sheets

(56) References Cited

U.S. PATENT DOCUMENTS

| | | | |
|---|---|---|---|
| 2015/0236870 A1* | 8/2015 | Lee | G06F 13/1689 370/257 |
| 2017/0223856 A1* | 8/2017 | Rohan | H02J 9/06 |
| 2019/0205244 A1* | 7/2019 | Smith | G06F 3/0613 |

OTHER PUBLICATIONS

Partial International Search Report and Invitation to Pay Additional Fees, Application No. PCT/US2019/038390, 13 pages, dated Nov. 12, 2019.

* cited by examiner

US 10,983,936 B2

PROGRAMMABLE ARBITRARY SEQUENCE DIRECT MEMORY ACCESS CONTROLLER FOR CONFIGURING MULTIPLE CORE INDEPENDENT PERIPHERALS

RELATED PATENT APPLICATION

This application claims priority to commonly owned U.S. Provisional Patent Application Ser. No. 62/811,400; filed Feb. 27, 2019; entitled "Programmable Arbitrary Sequence Direct Memory Access Controller for Configuring Multiple Core Independent Peripherals," by Keith Edwin Curtis; and is hereby incorporated by reference herein for all purposes.

TECHNICAL FIELD

The present disclosure relates to direct memory access (DMA) control and, more particularly, a programmable arbitrary sequence DMA controller for configuring multiple core independent peripherals (CIPs).

BACKGROUND

A core independent peripheral is considered to be a peripheral that does not need to be controlled by the CPU to perform its function. For example, a conventional analog-to-digital converter must be controlled by the CPU to sample each value and the CPU must store the result once it is obtained. A core independent version of such an analog-to-digital converter may be still configured by the CPU but once it has been configured, it may operate independently from the CPU and for example may be independently triggered and store results in specific locations. Other core independent peripherals may be implemented which allows to free the CPU from control tasks and, thus, enhance processing power of a microcontroller. One of the main advantages to core independent peripherals (CIPs) is that they can be reconfigured on-the-fly to change the performance or operation of the CIP, a pseudo peripheral. Unfortunately, the CIP configuration registers may be scattered across multiple memory mapped special function register (SFR) address banks. Using program firmware to do a CIP reconfiguration is also relatively slow and incurs a latency time in response to an external signal.

One method that can be used is configuring together two DMA peripherals, one which accesses the SFR address list from memory, and then programs the second DMA peripheral with these SFR addresses which then makes the actual CIP reconfiguration data transfers to the CIP SFRs. This is very inefficient in that multiple registers are duplicated, and the writing speed is slower. It also requires the two DMA peripherals be cross-connected in such a way as to trigger each other. If either DMA peripheral hits an error or a fault the DMA operation fails.

SUMMARY

Therefore, what is needed is a programmable arbitrary sequence direct memory access (DMA) controller that may be triggered externally and can also jump to different non-sequential memory locations in a programmable order.

According to an embodiment, a programmable arbitrary sequence direct memory access (DMA) controller may comprise: a first address pointer register; a second address pointer register; a data latch coupled to a first data bus; an address latch coupled to a second data bus; a multiplexer having a first input coupled to the first address pointer register, a second input coupled to the address latch, a third input coupled to the second address pointer register, and an output coupled to an address bus; and control logic coupled to and controlling the first and second address pointer registers, the address latch, the multiplexer and the data latch.

According to a further embodiment, the control logic may communicate with bus arbitration logic. According to a further embodiment, the data latch may write to and read from the first data bus. According to a further embodiment, the first data bus may be coupled to a data memory. According to a further embodiment, the second data bus may be coupled to a program memory. According to a further embodiment, the program memory may be a non-volatile memory. According to a further embodiment, the non-volatile memory may be a flash programmable memory. According to a further embodiment, the data memory may be a random-access memory (RAM). According to a further embodiment, the first and second data buses may be coupled to a memory. According to a further embodiment, first and second byte counters may communicate with the control logic and may count a number of data bytes transferred.

According to another embodiment, a method for indirect memory addressing with a programmable arbitrary sequence direct memory access (DMA) controller may comprise the steps of: reading a register address stored at a memory address specified by a first address pointer register; storing the register address in an address latch; reading configuration data stored at another memory address specified by a second address pointer register; storing the configuration data in a data latch; and writing the configuration data stored in the data latch to a register at the register address stored in the address latch.

According to a further embodiment of the method may comprise the step of coupling the data latch to a first data bus and data memory. According to a further embodiment of the method may comprise the step of coupling the address latch to a second data bus and program memory. According to a further embodiment of the method, the register may be a peripheral register. According to a further embodiment of the method, peripheral register may be a special function register. According to a further embodiment of the method, the special function register may be associated with a core independent peripheral (CIP).

According to yet another embodiment, a method for indirect memory addressing with a programmable arbitrary sequence direct memory access (DMA) controller comprise the steps of: reading a register address stored at a memory address specified by a first address pointer register; storing the register address in an address latch; reading configuration data stored in a peripheral register having a memory address specified by the register address in the address latch; storing the configuration data in a data latch; and writing the configuration data to a memory at an address specified by a second address pointer register.

According to a further embodiment of the method may comprise the step of coupling the data latch to a first data bus and data memory. According to a further embodiment of the method may comprise the step of coupling the address latch to a second data bus and program memory. According to a further embodiment of the method, the register may be a peripheral register. According to a further embodiment of the method, the peripheral register may be a special function register. According to a further embodiment of the method, the special function register may be associated with a core independent peripheral (CIP).

BRIEF DESCRIPTION OF THE DRAWINGS

A more complete understanding of the present disclosure may be acquired by referring to the following description taken in conjunction with the accompanying drawings wherein.

Figure 1:
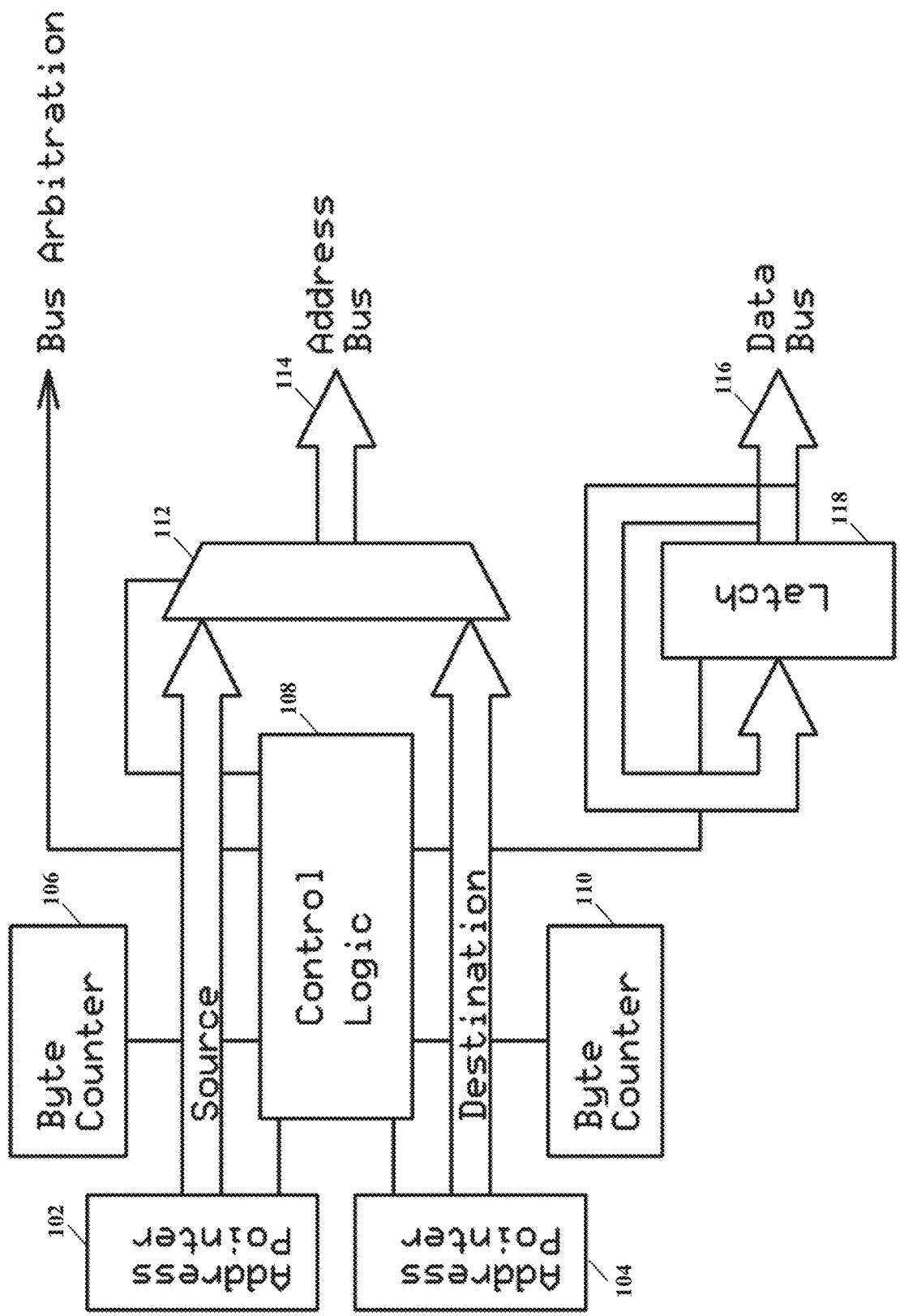
FIG. 1 illustrates a prior art schematic block diagram of a direct memory access (DMA) controller.

While the present disclosure is susceptible to various modifications and alternative forms, specific example embodiments thereof have been shown in the drawings and are herein described in detail. It should be understood, however, that the description herein of specific example embodiments is not intended to limit the disclosure to the forms disclosed herein.

DETAILED DESCRIPTION

Embodiments of the present disclosure may comprise a programmable arbitrary sequence DMA controller. One side of a memory system address (source or destination) is accessed normally (sequentially) using source/destination address registers and a counter. The second side of the memory system (destination or source) is accessed indirectly. An address register holds an address of a memory location. The memory location holds the actual location to be accessed. Using this method, for example but without limitation, a list of special function register (SFR) addresses may be programmed into memory and when the DMA is triggered, the data is transferred to the SFR addresses in the order dictated by a list in the program memory. SFRs are generally registers for configuring and controlling functionality of various peripherals. For easy access to these registers, they are memory mapped to the data memory space.

According to specific example embodiments of this disclosure, the programmable arbitrary sequence DMA controller can copy the contents of multiple peripherals to memory, or from memory to the peripheral SFRs, without the requirement that the addresses of the SFRs be in sequential order. It also allows the DMA to potentially reconfigure the peripherals to any of several preset configurations simply by referencing different lists. The DMA can also be triggered by an external signal creating a dynamic system that can reconfigure the SFRs, e.g., of the CIPs in response to external stimuli.

The proposed solution is simpler than requiring two DMA controllers as it is a modification of an existing DMA controller design. It also eliminates the need to cross connect two different DMA controllers. It should be smaller, faster, and has a smaller SFR foot print than a pair of DMA controllers. In another embodiment, the DMA controller can be further enhanced by comprising a operation mode register that allows to control the DMA controller to operate in either the conventional operating mode or the indirect operating mode as will be explained in more detail below.

Referring now to the drawings, the details of example embodiments are schematically illustrated. Like elements in the drawings will be represented by like numbers, and similar elements will be represented by like numbers with a different lower-case letter suffix.

Referring to FIG. 1, depicted is a prior art schematic block diagram of a direct memory access (DMA) controller. The DMA controller may comprise a first address pointer register 102, a second address pointer register 104, a first byte counter 106, control logic 108, a second byte counter 110, a two-input multiplexer 112 and a data latch 118. The multiplexer 112 may be coupled to a memory address bus 114 and the data latch 118 may be coupled to a memory data bus 116. The control logic 108 may communicate with bus arbitration logic (not shown).

The first and second address pointer registers 102 and 104 increment sequentially with a counter (not shown) and point to sequential memory locations. The first address pointer register 102 contains an address of a memory location from which data is to be retrieved. The second address pointer register 104 contains an address of another memory location to which data is to be written. The memory (not shown) may be for example but is not limited to flash program memory, firmware memory, random access memory (RAM), inter alia.

The data is first read from the memory location specified by the first address pointer register 102, wherein the multiplexer 112 couples a source address from the first address pointer register 102 to the address bus 114 coupled to the memory bus (not shown). The contents (data) of that memory (source) location are read via the data bus 116 and stored in the data latch 118. Then the multiplexer 112 couples a destination address from the second address pointer register 104 to the address bus 114 and a memory (destination) location at that address is written to with the contents (data) stored in the data latch 118 via the data bus 116. The address bus 114 and data bus 116 may be coupled to a memory (not shown).

The aforementioned memory data transfer operation works well when the memory address locations are sequential but not so well when they are not since non-sequential memory address locations may not be feasible to cache and/or will add to memory addressing latency times. One way to do non-sequential DMA transfers requires two of the DMA controllers shown in FIG. 1. This is very inefficient in that multiple registers are duplicated, and the writing speed is slower. It also requires the two DMA controllers be cross-connected in such a way as to trigger each other. If either hits an error or a fault, the data transfer(s) fails.

Figure 2:
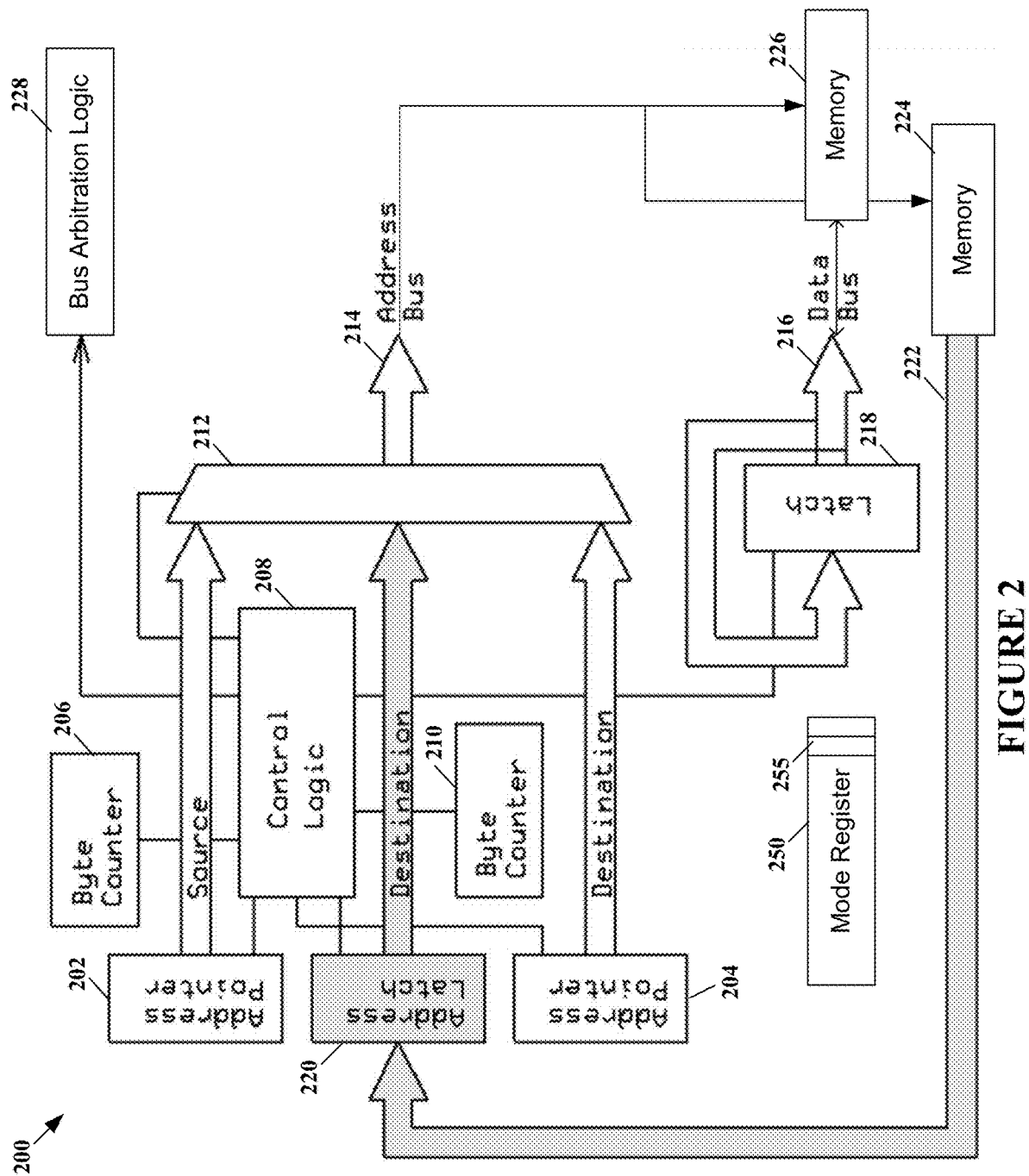
FIG. 2 illustrates a schematic block diagram of a programmable arbitrary sequence DMA controller, according to specific example embodiments of this disclosure.

Referring to FIG. 2, depicted is a schematic block diagram of a programmable arbitrary sequence DMA controller, according to specific example embodiments of this disclosure. A programmable arbitrary sequence DMA controller, generally referenced by the number 200, provides a better and more efficient way to handle arbitrary sequence DMA transfers is shown in FIG. 2. The programmable arbitrary sequence DMA controller 200 may comprise a first address pointer register 202, a second address pointer register 204, a first byte counter 206, a control logic 208, a second byte counter 210, a multiplexer 212 having outputs coupled to an address bus 214, a data latch 218 having outputs and inputs coupled to a first data bus 216, an address latch 220 having inputs coupled to a second data bus 222, and bus arbitration logic 228 in communication with the control logic 208.

The first data bus 216 may be coupled to a data memory 226 and the second data bus 222 may be coupled to a program memory 224. The data memory 226 may be, for example but is not limited to, an eight-bit memory, and the program memory 224 may be, for example but is not limited to, a fourteen-bit memory. Addressing of either memory may be over the address bus 214. The program memory 224 may contain indirect destination addresses to which the data is to be transferred to or read from. The program memory 224 coupled to the second data bus 222 may be, for example but is not limited to, a non-volatile random-access memory (RAM) such as a flash programmable memory. The data memory 226 may be volatile or non-volatile RAM. The data memory 226 and the program memory 224 may have the same bit width and be comprised of a single memory.

Operation of the programmable arbitrary sequence DMA controller shown in FIG. 2 is more fully disclosed hereinafter with reference to FIGS. 3 and 4 and the descriptions thereof. The second data bus 222 may be coupled to the same or a different memory as the first data bus 216. The address latch 220 is coupled to and reads and stores indirect destination addresses from the program memory 224 via the second data bus 222. The data latch 218 may read and write data to/from its associated memory via the first data bus 216. The control logic 208 may communicate with bus arbitration logic 228. The byte counters 206 and 210 may be used to count the number of memory bytes being transferred.

For allowing the DMA controller to operate in a conventional mode as shown in FIG. 1, an operating mode register 250 is provided. The operating mode register can allow to operate in either the conventional mode or the indirect mode, for example, by clearing or setting one bit 255 in register 250. Other configurations may be possible and more than one bit in register 250 may be used to define the actual operation mode. When operating in the conventional operating mode, address latch 220 will not be used and the DMA controller will function as described above with FIG. 1. The operating mode register can be a memory mapped special function register 250 or unused bits of an already present configuration register may be used for setting the indirect or conventional DMA operating mode.

Figure 3:
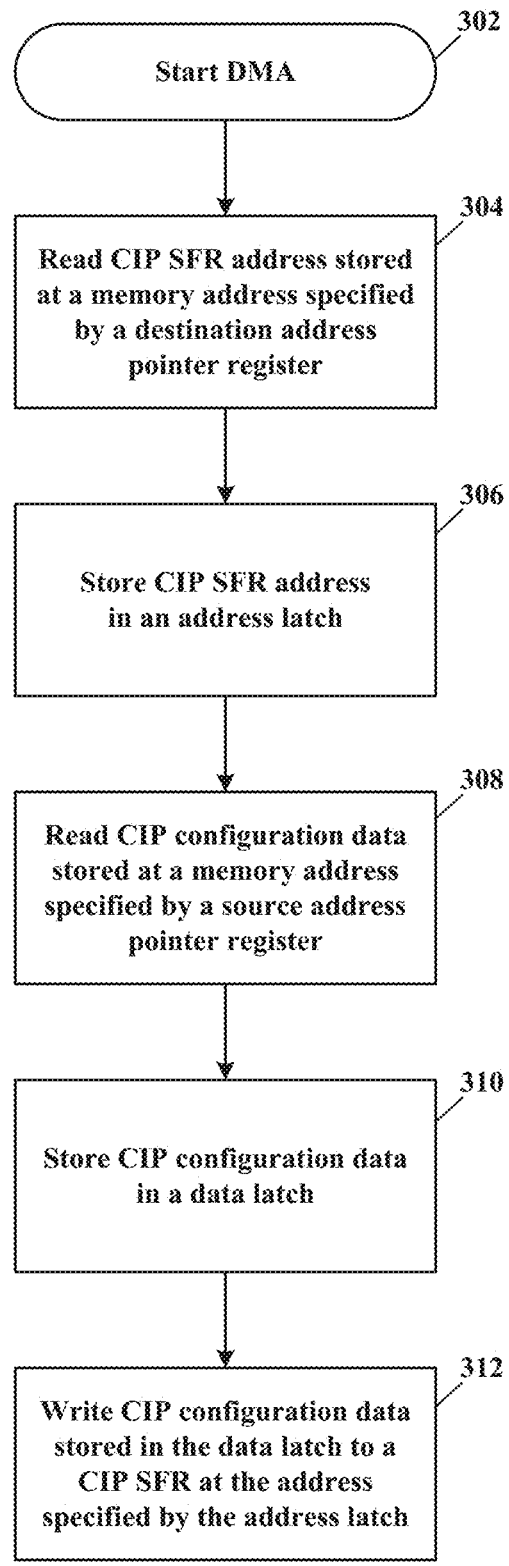
FIG. 3 illustrates a schematic flow diagram of the operation of the programmable arbitrary sequence DMA controller of FIG. 2 loading new configuration data into an arbitrary sequence memory location, according to specific example embodiments of this disclosure.
Figure 4:
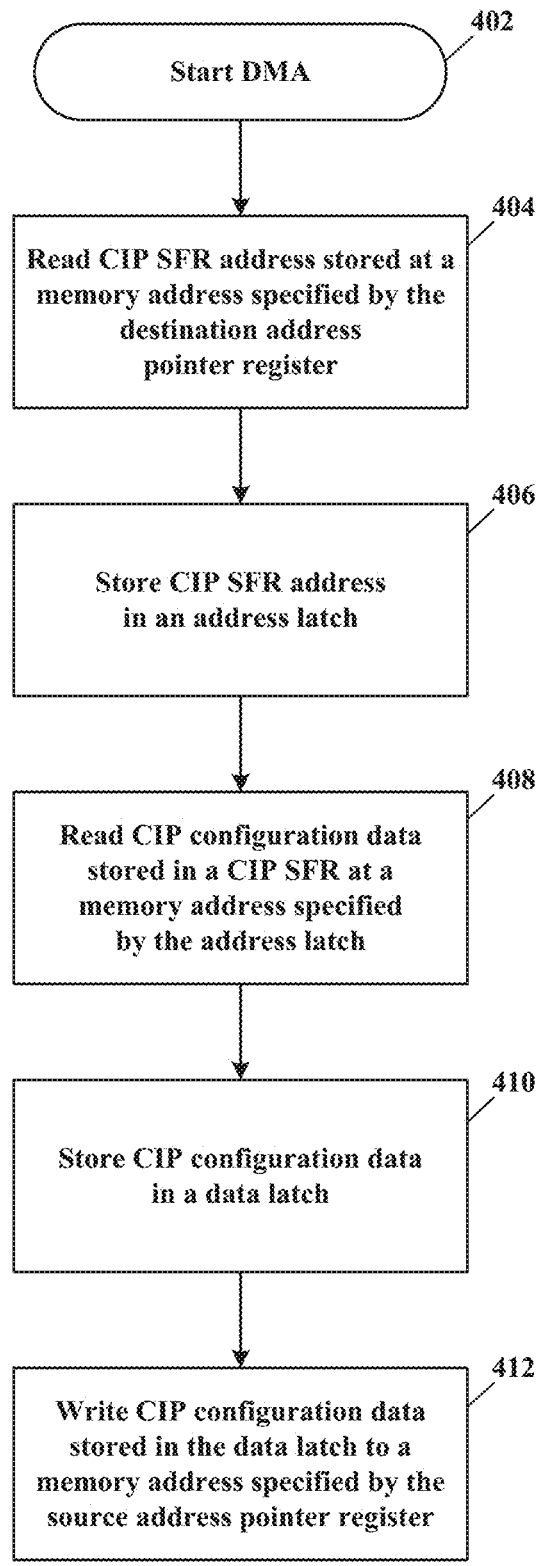
FIG. 4 illustrates a schematic flow diagram of the operation of the programmable arbitrary sequence DMA controller of FIG. 2 reading existing configuration data from an arbitrary sequence memory location, according to specific example embodiments of this disclosure.

References to core independent peripheral (CIP) and special function register (SFR) address and data will be used herein for illustrative purposes as shown in FIGS. 3 and 4 and the descriptions thereof hereinafter. One having ordinary skill in the art of digital electronics and the benefit of this disclosure will readily understand and be able to apply the teachings of this disclosure to other applications and peripheral register configuration writing and reading requiring indirect DMA addressing.

Referring to FIG. 3, depicted is a schematic flow diagram of the operation of the programmable arbitrary sequence DMA controller of FIG. 2 loading new configuration data into an arbitrary sequence memory location, according to specific example embodiments of this disclosure. The arbitrary sequence memory location is determined by a memory address stored in another memory location. In step 302 DMA transfers begin. A) In step 304 a CIP SFR address stored in memory at a memory address specified by a first address pointer register 202 is read and then stored in an address latch 220 in step 306, e.g., from program memory 224 via second data bus 222. B) In step 308 CIP configuration data stored in data memory 226 at a memory address specified by a second address pointer register 204 is read, utilizing address bus 214 and second data bus 222, and is stored in the data latch 218 in step 310. C) In step 312 the CIP configuration data stored in the data latch 218 of step 310 is written into the CIP SFR (memory) address, which is a particular address in data memory 226, stored in the address latch 220, utilizing address bus 214 and first data bus 216. Thus, only three DMA transfers are required to perform indirect addressing to configure or update a CIP SFR. These DMA transfers may be repeated for each CIP SFR required to be loaded or updated, e.g., for a plurality of CIP SFRs.

Referring to FIG. 4, depicted is a schematic flow diagram of the operation of the programmable arbitrary sequence DMA controller of FIG. 2 reading existing configuration data from an arbitrary sequence memory location, according to specific example embodiments of this disclosure. The arbitrary sequence memory location is determined by a memory address stored in another memory location specified by in an address pointer register. In step 402 DMA transfers begin. A) In step 404 a CIP SFR address stored in memory, e.g., program memory 224, at a memory address specified by a first address pointer register 202 is read, utilizing address bus 214 and second data bus 222, and then stored in an address latch 220 in step 406 by coupling the address latch 220 to the second data bus 222 and program memory 224. B) In step 408 CIP configuration data stored in the CIP SFR which is a particular address in data memory 226, at a memory address specified by the address latch 220 is read, by coupling the address latch 220 to and utilizing address bus 214 and first data bus 216, and then is stored in the data latch 218 in step 410. C) In step 412 the CIP configuration data stored in the data latch 218 is written into a memory address of data memory 226 specified by a second address pointer register 204, utilizing address bus 214 and data bus 216. Thus, only three DMA transfers are required to perform indirect addressing to read the contents of a CIP SFR and store it in a memory location defined by the first address pointer register 202. These DMA transfers may be repeated for each CIP SFR required to be read, e.g., for a plurality of CIP SFRs.

Figure 5:
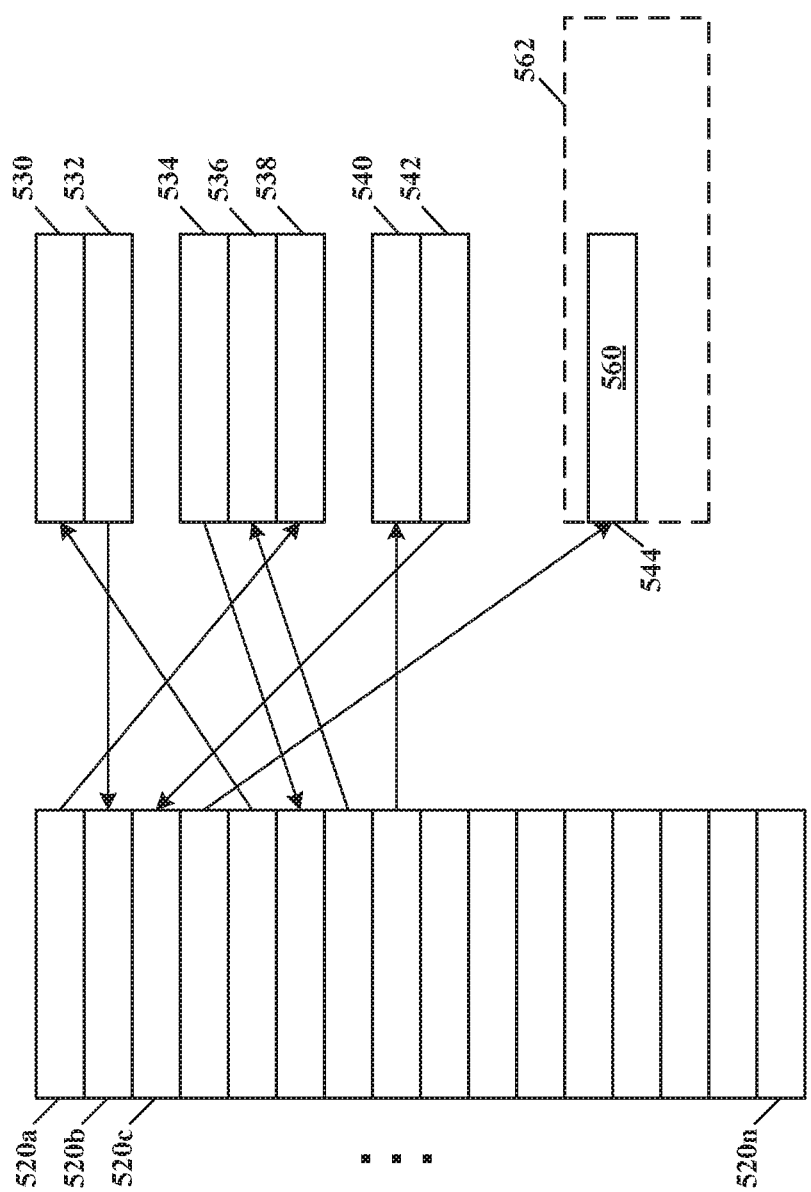
FIG. 5 illustrates a schematic block diagram of sequential and non-sequential memory locations.

Referring to FIG. 5, depicted is a schematic block diagram of sequential and non-sequential memory locations. Sequential memory locations 520, which may represent a portion of program memory 224, may be used to store the addresses of non-sequential memory locations 530-544, which may represent a portion of data memory 226. The non-sequential memory locations 530-544 may be memory-mapped to special function registers of various peripherals for storing data, e.g., configuration data. The registers may comprise at least one special function register (SFR) 560 of a core independent peripheral (CIP) 562 that has a non-sequential memory location 544. Alternatively, SFR 560 may be a peripheral register. Addresses for the non-sequential memory locations 530-544 may be stored in the sequential memory locations 520$a$-$n$ and accessed as described hereinabove. The non-sequential memory locations 530-544 may be used primarily for SFR 560 addresses.

The present disclosure has been described in terms of one or more embodiments, and it should be appreciated that many equivalents, alternatives, variations, and modifications, aside from those expressly stated, are possible and within the scope of the disclosure. While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein.

What is claimed is:

1. A programmable arbitrary sequence direct memory access (DMA) controller, comprising:
   a first address pointer register storing a first source address wherein the first source address is an address within a memory space accessible by the programmable arbitrary sequence DMA controller;
   a second address pointer register storing a first destination address wherein the first destination address is an address within the memory space;
   a data latch coupled to a first data bus storing data from the first source address;
   an address latch coupled to a second data bus storing a second source address or a second destination address, wherein the second source address or the second destination address is an address within the memory space;
   a multiplexer having a first input coupled to the first address pointer register, a second input coupled to the address latch, a third input coupled to the second address pointer register, and an output coupled to an address bus;
   control logic coupled to and controlling the first and second address pointer registers, the address latch, the multiplexer and the data latch, wherein the programmable arbitrary sequence DMA controller transfers data from a source to a destination wherein the control logic of the programmable arbitrary sequence DMA controller is configured to store data from the first source address or the second source address in the data latch and thereafter transfer the data from the data latch to the first destination address or the second destination address, and
   a control register configured to control an operating mode of the DMA controller, wherein when operating in a first mode, the DMA controller is configured to use the first address pointer register for storing the first source address and the second address pointer register for storing the first destination address, and when operating in a second mode, the DMA controller is configured to receive the second source address or the second destination address in the address latch from the second data bus.

2. The programmable arbitrary sequence DMA controller according to claim 1, wherein one bit in the control register determines whether the DMA controller operates in the first or second mode.

3. The programmable arbitrary sequence DMA controller according to claim 1, wherein the control logic communicates with bus arbitration logic.

4. The programmable arbitrary sequence DMA controller according to claim 1, wherein the data latch writes to and reads from the first data bus.

5. The programmable arbitrary sequence DMA controller according to claim 1, wherein the first data bus is coupled to a data memory.

6. The programmable arbitrary sequence DMA controller according to claim 5, wherein the data memory is a random-access memory (RAM).

7. The programmable arbitrary sequence DMA controller according to claim 1, wherein the second data bus is coupled to a program memory.

8. The programmable arbitrary sequence DMA controller according to claim 7, wherein the program memory is a non-volatile memory.

9. The programmable arbitrary sequence DMA controller according to claim 8, wherein the non-volatile memory is a flash programmable memory.

10. The programmable arbitrary sequence DMA controller according to claim 1, wherein the first and second data buses are each coupled to a memory.

11. The programmable arbitrary sequence DMA controller according to claim 1, further comprising first and second byte counters communicating with the control logic and counting a number of data bytes transferred.

12. A method for indirect memory addressing with a programmable arbitrary sequence direct memory access (DMA) controller configured to transfer data within a memory space, said method comprising the steps of:
   determining an operating mode from a control register configured to control an operating mode of the DMA controller;
   wherein when operating in a first mode:
      for performing a DMA transfer, using a first address pointer register for storing a first source address and a second address pointer register for storing a first destination address;
   and when operating in a second mode:
      reading a register address stored at a memory address specified by the first address pointer register, wherein the memory address is an address within the memory space accessible by the programmable arbitrary sequence DMA controller;
      storing the register address in an address latch;
      reading configuration data stored at another memory address specified by the second address pointer register, wherein the another memory address is an address within the memory space;
      storing the configuration data in a data latch; and
      writing the configuration data stored in the data latch to a register at the register address stored in the address latch.

13. The method according to claim 12, wherein the register is a peripheral register.

14. The method according to claim 13, wherein the peripheral register is a special function register.

15. The method according to claim 14, wherein the special function register is associated with a core independent peripheral (CIP).

16. The method according to claim 12, further comprising the step of coupling the data latch to a first data bus and data memory.

17. The method according to claim 12, further comprising the step of coupling the address latch to a second data bus and program memory.

18. The method according to claim 12, wherein the DMA controller is configurable to operate in a direct addressing mode in which the first address pointer register stores a source address and the second address pointer register stores a destination address.

19. A method for indirect memory addressing with a programmable arbitrary sequence direct memory access (DMA) controller configured to transfer data within a memory space, said method comprising the steps of:
   determining an operating mode from a control register configured to control an operating mode of the DMA controller;
   wherein when operating in a first mode:
      for performing a DMA transfer, using a first address pointer register for storing a first source address and a second address pointer register for storing a first destination address;

and when operating in a second mode:
- reading a register address stored at a first memory address specified by the first address pointer register, wherein the first memory address is an address within a memory space accessible by the programmable arbitrary sequence DMA controller;
- storing the register address in an address latch;
- reading configuration data stored in a peripheral register having a second memory address specified by the register address in the address latch wherein the second address is an address within the memory space;
- storing the configuration data in a data latch; and
- writing the configuration data to a memory at an address specified by the second address pointer register.

20. The method according to claim 19, wherein the register is a peripheral register.

21. The method according to claim 20, wherein the peripheral register is a special function register.

22. The method according to claim 21, wherein the special function register is associated with a core independent peripheral (CIP).

23. The method according to claim 19, further comprising the step of coupling the data latch to a first data bus and data memory.

24. The method according to claim 19, further comprising the step of coupling the address latch to a second data bus and program memory.

25. The method according to claim 19, wherein the DMA controller is configurable to operate in a direct addressing mode in which the first address pointer register stores a source address and the second address pointer register stores a destination address.

* * * * *